Feb. 13, 1940. J. KÖHLER 2,190,120
OIL ACTUATED BRAKING SYSTEM FOR VEHICLES
Filed April 19, 1938 2 Sheets-Sheet 1

Inventor
Johannes Köhler,
By Bailey & Carson
Attorneys

Feb. 13, 1940.  J. KÖHLER  2,190,120
OIL ACTUATED BRAKING SYSTEM FOR VEHICLES
Filed April 19, 1938  2 Sheets-Sheet 2

Inventor:
Johannes Köhler,
Attorneys

Patented Feb. 13, 1940

2,190,120

UNITED STATES PATENT OFFICE 2,190,120

OIL ACTUATED BRAKING SYSTEM FOR VEHICLES

Johannes Köhler, Berlin-Grunewald, Germany

Application April 19, 1938, Serial No. 202,949
In Germany February 26, 1935

10 Claims. (Cl. 188—152)

The invention relates to an oil brake for the trailers of power vehicles and which is driven by an electric motor, being particularly suitable for tractors driven by internal combustion engines.

In braking trailers from motor vehicles it is difficult to transmit the braking power perfectly to the trailer if fluid braking medium is used therefor. According to the invention this difficulty is avoided by arranging an electric motor on the trailer which drives an oil pump for moving the pressure oil, thus avoiding oil passages which can give rise to oil losses through leakage at the connecting points between the trailer and drive vehicle. It is necessary only that the electrical energy for driving the electric motor or for controlling the relays in the motor line be transmitted to the trailer.

Full understanding of the invention is available by reference to the following specification and drawings in which.

Figure 1:
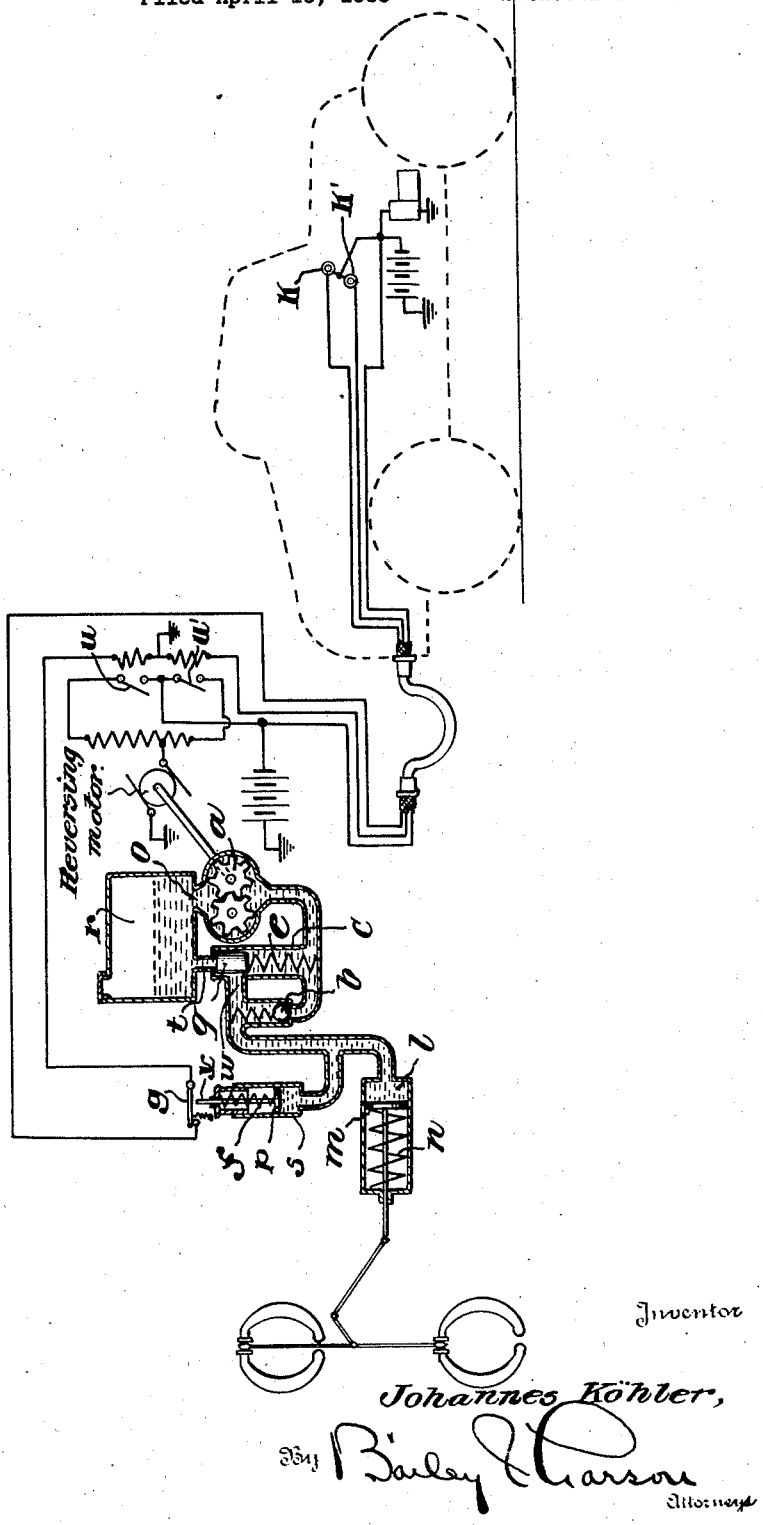
Fig. 1 is a diagrammatic showing of one form of the invention.

Fig. 1 shows, at the right, the dotted outlines of the tractor, from the driver's seat of which the trailer brakes may be applied or released. The center of the figure shows the arrangement of the parts to be mounted on the trailer, such as control passages, electric motor, oil pressure pump, oil reservoir, oil pressure passages and brake cylinders, and at the left the brakes of a set of trailer wheels, which are actuated by the movement of the brake cylinder piston are shown.

The lighting apparatus and lighting battery are mounted on the tractor and two press buttons $k$ and $k'$ are disposed adjacent the driver's seat, one of which serves to apply, the other to release the brakes. When one of the two buttons is pressed a corresponding relay $u$ or $u'$ on the trailer is actuated and the motor of the pump $a$ is thereby connected with its battery in one or the other rotational directions.

When the motor rotates in the direction for applying the brake the pump $a$ takes brake liquid, which as a rule may be oil, through the passage $o$ from reservoir $v$ and forces it past check valve $b$ into brake cylinder $l$. In the cylinder $l$, there is a piston $m$ operatively connected by a conventional linkage system to the brakes of a vehicle. For the present considerations, it is sufficient to note that piston $m$ is normally urged to a brake-releasing position by a spring $n$.

An undesirable phenomenon takes place as a result of the slip of the oil pump. When the pump is at a standstill this slip may permit the back flow of the oil previously pumped into the brake cylinder, thus causing unintentional relaxation of the brake action. In order to preclude this defect the check valve $b$ is interposed in the passage from the pump $a$ to the brake cylinder $l$.

This, however, makes a further measure necessary whereby the oil can be removed from the brake cylinders over another path. This path must be free immediately when the pump begins its suction action.

For this purpose, a cylinder $c$ is connected at its lower end between pump $a$ and the check valve. The upper end of cylinder $c$ is connected by passage $t$ to reservoir $v$, while the side opening $w$ of cylinder $c$ is connected between the check valve and brake cylinder $l$.

Piston $q$, which is slidable in cylinder $c$, is normally held by spring $e$ so that it closes passage $w$. When, however, pump $a$ is driven in a brake-releasing direction, check valve $b$ closes, and piston $q$ is drawn downwardly against the compression of spring $e$ thus to connect passages $o$ and $w$. In this manner, cylinder $l$ is connected directly to reservoir $r$, and so long as pump $a$ operates in a brake-releasing direction, piston $m$ will be free to move to a brake-releasing position.

The function of the passage $t$ connected with the oil reservoir is to prevent excessive vacuum in the brake cylinders and the passages leading thereto, which might occur by penetration of air at leak points. This might occur when, on continuous suction of the pump, oil is drawn from the reservoir, whereby the brake cylinders would be drawn dry.

In order to preclude excessive pressure on application of the brakes a safety valve is also connected to the passage in front of the check valve and which is so dimensioned as to blow off at a pressure which is somewhat less than that necessary for locking the brakes.

As shown in Fig. 1, the safety device, which comprises the cylinder $s$, piston $p$, and the spring $f$ drives the rod $x$ upwardly when excessive oil pressure overcomes the spring $f$ to open switch $g$. The switch $g$ is in circuit with the relay $u$ so that the electric motor is rendered inoperative to drive the pump when the oil pressure becomes excessive.

Figure 2:
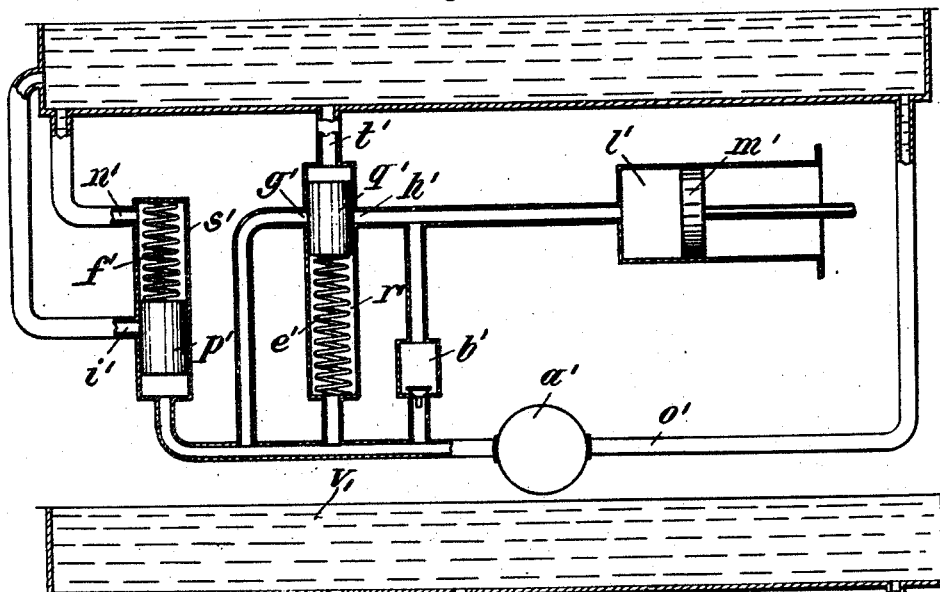
Fig. 2 is a diagram of a second form.

On Fig. 2 a pump $a'$ is shown which is driven in both rotational directions by a motor (not shown on the drawings). This pump, in the first rotational direction, takes oil or other suitable fluid through a passage $o'$ from a receptacle $v'$. All the passages $o'$, $i'$, $n'$, $t'$ empty into this receptacle. The oil drawn by the pump $a'$ in the first rotational direction is forced through a check valve $b'$ into the cylinder $l'$ and there actuates the brake piston $m'$ so that the brakes act on the wheels.

At the same time, the piston $p'$ is also moved upwardly in the cylinder $s'$ and the piston $q'$ in the cylinder $r'$. The spring $f'$ and the counter-pressure of the oil from the receptacle through passage $n'$ oppose the movement of piston $p'$. When the pressure of the pump exceeds the permissible maximum, the piston $p'$ opens the passage $i'$, through which the oil passes into the oil receptacle, until the pressure at the pump again has the permissible value. The upward movement of piston $q'$ in cylinder $r'$, which is supported by the spring $e'$, has no effect during the brake setting operation as this piston strikes against the upper end of cylinder $r'$.

When, however, pump $a'$ is driven in the second rotational direction, the valve $b'$ closes under the pressure of the oil in brake cylinder $l$, and a sub-pressure arises in the passages which connect cylinders $s'$ and $r'$ whereby pistons $p'$ and $q'$ move downwardly. The downward movement of piston $p'$ is without effect, as it strikes against the lower cover of cylinder $s'$, but the downward movement of piston $q'$ opens the connection between passages $t'$, $g'$ and $h'$. The oil flows from cylinder $l'$ through passages $h'$ and $g'$ back to pump $a'$, so that the brake is released. After the brake is released, the pump, in idling, draws oil through passage $t'$ from the oil receptacle and forces the same oil back to the receptacle through passage $o'$. It should be understood that electrical connections to the motor driving pump $a'$ and the brake operated by piston $m'$ are similar to those shown in Fig. 1.

Figure 3:
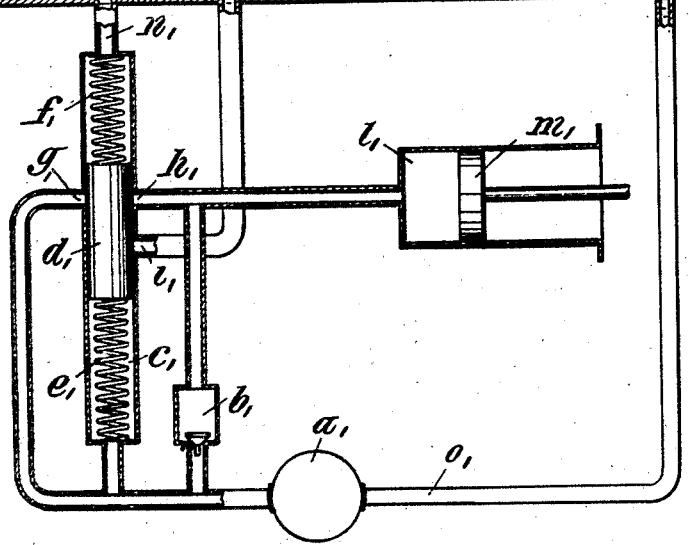
Fig. 3 is a diagram of a third form.

In Fig. 3 a third embodiment of the invention is disclosed. As in the figures previously described, a motor driven pump $a_1$ is connected by pipe $o_1$ to oil reservoir $v_1$. When pump $a_1$ is operated in a brake-closing direction, oil is forced through check valve $b_1$ directly to cylinder $l_1$ to drive piston $m_1$ to the right, thus to operate the brakes as disclosed in Fig. 1.

A passage $g_1$, $h_1$ is shunted around check valve $b_1$, and a cylinder $c_1$ is connected in the circuit in the following manner: The lower end of the cylinder is connected to passage $g_1$, and the top end of the cylinder is connected by pipe $n_1$ to the reservoir. The upper central portion of the cylinder connects the passages $g_1$, $h_1$ and a leak $i_1$ connects the middle of the cylinder with the reservoir.

A piston $d_1$ is maintained in the central portion of cylinder $c_1$ so as normally to cover the entrance of pipes $g_1$, $h_1$ and $i_1$ by springs $e_1$ and $f_1$ engaged, respectively, between the ends of the cylinder and piston.

In the system disclosed in Fig. 3, when the oil pressure in the circuit through check valve $b_1$ to cylinder $l_1$ exceeds the maximum for safety, piston $d_1$ will be driven upwardly to open the leak passage $i_1$ to reservoir $v_1$. On the other hand, so long as pump $a_1$ is operated in a brake-releasing manner, piston $d_1$ is drawn downwardly whereby to connect passages $g_1$, $h_1$ with each other and, through passage $n_1$, to reservoir $v_1$.

I claim:

1. In an oil actuated braking system, a reversible pump driven by an electric motor, an oil container connected to one side of the pump, an oil conduit leading from the other side of the pump to the braking cylinder, said conduit being provided with a non return valve, a brake release conduit connected across said valve and means for keeping the brake release conduit closed, said means being operated to open the conduit when the pump is functioning in reverse.

2. In an oil actuated braking system, a reversible pump driven by an electric motor, an oil container connected to one side of the pump, an oil conduit leading from the other side of the pump to the braking cylinder, said conduit being provided with a non return valve, a brake release conduit connected across said valve, means for normally closing said brake release conduit, said means being operated to open the conduit when the pump is functioning in reverse and a third conduit also adapted to be opened when the pump is functioning in reverse and which is connected to the oil container whereby the brake cylinder cannot be sucked dry.

3. In an oil actuated braking system, a reversible pump driven by an electric motor, an oil container connected to one side of the pump, an oil conduit leading from the other side of the pump to the braking cylinder, said conduit being provided with a non return valve, a brake release conduit connected across said valve, means for normally closing said brake release conduit, said means being operated to open said brake release conduit when the pump is functioning in reverse and means for passing oil supplied from the pump back to the oil container instead of to the brake cylinder should a certain pressure be exceeded.

4. In an oil actuated braking system, a reversible pump driven by an electric motor, an oil container connected to one side of the pump, an oil conduit leading from the other side of the pump to the braking cylinder, said conduit being provided with a non return valve, a brake release conduit connected across said valve, means for normally closing said brake release conduit, said means being operated to open said brake release conduit when the pump is functioning in reverse and also to pass oil supplied from the pump back to the oil container instead of to the brake cylinder should a certain pressure be exceeded.

5. In an oil actuated braking system, a reversible pump driven by an electric motor, an oil container connected to one side of the pump, an oil conduit leading from the other side of the pump to the brake cylinder, said conduit being provided with a non return valve, a second conduit connected across said non return valve and interrupted by a cylinder cutting across the conduit, said cylinder being connected to the oil container at one end and at the other end to said second conduit and containing a piston under the influence of a spring, and a third conduit leading from the pump to a cylinder having two connections to the oil container and containing a piston under the influence of a spring.

6. In an oil actuated braking system, a reversible pump driven by an electric motor, an oil container connected to one side of the pump, an oil conduit leading from the other side of the pump to the brake cylinder, said conduit being provided with a non return valve, a second conduit connected across said non return valve and interrupted by a cylinder, said cylinder being connected at one end to the oil container and at the other end to said second oil conduit and having a further connection to the oil container and containing a spring loaded piston acting as a valve controlling the passage of oil through said second conduit.

7. A hydraulic brake for trailers of the type drawn by a motor vehicle comprising a reversible electric motor, an electric circuit connecting said motor to said vehicle, switch means for controlling said circuit whereby to operate said motor in either of two directions, selectively, a fluid pump driven by said motor, a reservoir connected to one side of said pump and one end of a fluid circuit connected to the other side, a cylinder at the other end of said fluid circuit, a piston in said cylinder, brake means operatively connected to said piston, said piston being slidable in said cylinder between brake actuating and brake releasing position in accordance with the direction of flow of said fluid in said circuit, a spring operatively connected to said piston and normally tending to drive the same to a brake releasing position, a check valve in said fluid circuit between said pump and said cylinder for preventing the back-flow of fluid from the cylinder to the pump, and a fluid passage between said reservoir and the portion of said fluid circuit between said check-valve and said cylinder.

8. A brake as claimed in claim 7, said passage having a piston-valve therein, one side of the piston valve being connected to said circuit between said check-valve and said pump, and a spring for keeping said piston valve normally closed whereby, when said motor is reversed, said check-valve prevents said pump from exhausting said oil in the cylinder and whereby the suction from said pump on said piston valve opens the same for allowing oil to flow from the cylinder to the reservoir.

9. A hydraulic brake for trailers of the type drawn by a motor vehicle comprising a reversible electric motor, an electric circuit connecting said motor to said vehicle, switch means for controlling said circuit whereby to operate said motor in either of two directions, selectively, a fluid pump driven by said motor, a reservoir connected to one side of said pump and one end of a fluid circuit connected to the other side, a cylinder at the other end of said fluid circuit, a piston in said cylinder, brake means operatively connected to said piston, said piston being slidable in said cylinder between brake actuating and brake-releasing position in accordance with the direction of flow of said fluid in said circuit, a check-valve in said fluid circuit between said pump and said cylinder for preventing the back-flow of fluid from said cylinder to said pump, a shunt fluid circuit around said check-valve, said shunt circuit having a piston valve thereacross, said piston valve comprising a second cylinder having opposed openings in the side walls thereof for inletting said shunt circuit, a third opening in said side wall, below the first mentioned openings, a fluid line connecting said cylinder through said third opening to said reservoir, a top opening at the top end of said second cylinder, a second fluid line connecting said second cylinder to said reservoir through said top opening, the lower end of said second cylinder being connected to said shunt circuit between said piston valve and said pump, a second piston in said second cylinder, and a spring engaged between each end of said piston and the end walls of said second cylinder whereby normally to hold said second piston in such position as to close all the openings in the side wall of said cylinder so that, upon occurrence of excess pressure in said fluid circuit, said second piston is driven upwardly to connect said fluid circuit to said reservoir through said second cylinder and the lower opening in the side wall thereof and whereby, upon reversal of said motor and pump, said second piston is drawn downwardly whereby to connect the first cylinder with the reservoir.

10. A brake as claimed in claim 7, said passage having a piston-valve therein, one side of the piston valve being connected to said circuit between said check-valve and said pump, and a spring for keeping said piston valve normally closed whereby, when said motor is reversed, said check-valve prevents said pump from exhausting said oil in the cylinder and whereby the suction from said pump on said piston valve opens the same for allowing oil to flow from the cylinder to the reservoir, a spring loaded safety valve connected to said fluid circuit, a switch opened by said safety valve when excess pressure in said fluid circuit moves the same, said switch being connected to said electric circuit whereby to render said motor inoperative.

JOHANNES KÖHLER.